United States Patent
Adler et al.

(10) Patent No.: US 10,430,266 B2
(45) Date of Patent: Oct. 1, 2019

(54) FULL STATE SESSION REVIVING, FORKING, AND SNAPSHOTING BASED ON AN APPLICATION DATA DUMP

(71) Applicant: VMware, Inc., Palo Alto, CA (US)

(72) Inventors: Nir Adler, Netanya (IL); Dima Golbert, Beit Shemesh (IL); Or Lupovitz, Rishon Le Zion (IL); Kosta Shougaev, Rehovot (IL)

(73) Assignee: VMware, Inc., Palo Alto, CA (US)

( * ) Notice: Subject to any disclaimer, the term of this patent is extended or adjusted under 35 U.S.C. 154(b) by 82 days.

(21) Appl. No.: 15/181,010

(22) Filed: Jun. 13, 2016

(65) Prior Publication Data

US 2017/0357544 A1    Dec. 14, 2017

(51) Int. Cl.
    *G06F 11/07*    (2006.01)

(52) U.S. Cl.
    CPC ............... *G06F 11/0778* (2013.01)

(58) Field of Classification Search
    CPC ............ G06F 11/1484; G06F 11/3636; G06F 11/0727; G06F 11/0778
    USPC .............................................. 714/4.12, 38.11
    See application file for complete search history.

(56) References Cited

U.S. PATENT DOCUMENTS

| | | | | |
|---|---|---|---|---|
| 7,882,326 B2 * | 2/2011 | Armstrong | ............ | G06F 9/4856 711/173 |
| 8,539,488 B1 * | 9/2013 | Havemose | .......... | G06F 11/1469 718/100 |
| 9,443,192 B1 * | 9/2016 | Cosic | ........................ | G06N 3/02 |
| 2004/0255048 A1 * | 12/2004 | Lev Ran | ................. | G06F 9/546 709/249 |
| 2005/0177821 A1 * | 8/2005 | Ogata | ................. | G06F 11/3612 717/148 |
| 2005/0273785 A1 * | 12/2005 | Kass | ....................... | G06F 9/461 718/100 |
| 2006/0117048 A1 * | 6/2006 | Thind | ............... | G06F 17/30067 |
| 2007/0168989 A1 * | 7/2007 | Edwards | ............. | G06F 11/3636 717/127 |
| 2008/0276129 A1 * | 11/2008 | Cocker | ............... | G06F 11/3471 714/45 |
| 2008/0313282 A1 * | 12/2008 | Warila | ...................... | G06F 8/24 709/206 |
| 2009/0133033 A1 * | 5/2009 | Lindo | ................. | G06F 11/3624 718/108 |
| 2009/0307430 A1 * | 12/2009 | Bruening | ............ | G06F 12/0862 711/119 |
| 2010/0131932 A1 * | 5/2010 | Kato | ................... | G06F 9/44521 717/136 |
| 2010/0262977 A1 * | 10/2010 | Havemose | .............. | G06F 9/545 719/310 |

(Continued)

*Primary Examiner* — Chae M Ko (57) ABSTRACT

Systems and methods are described for capturing and reproducing the full state of an application session. An application is captured by performing a dump of various components of the session and storing the components in an application session capture. Captured components include a memory image, CPU register values, open handles to kernel objects, and loaded libraries. The session is reproduced when requested based on the session capture. In cases where locations or references to certain items (e.g., memory locations, open handle references, library addresses, etc.) are different when the session is restored, a driver is used to remap the old locations or references to the new locations or references.

20 Claims, 5 Drawing Sheets

(56) References Cited

U.S. PATENT DOCUMENTS

| | | | |
|---|---|---|---|
| 2011/0264959 A1* | 10/2011 | Subhraveti | G06F 11/3636 714/35 |
| 2011/0302577 A1* | 12/2011 | Reuther | G06F 9/45558 718/1 |
| 2011/0307870 A1* | 12/2011 | Stairs | G06F 11/362 717/128 |
| 2012/0011508 A1* | 1/2012 | Ahmad | G06F 12/1009 718/1 |
| 2012/0167117 A1* | 6/2012 | Kekeh | G06F 9/485 719/318 |
| 2013/0080809 A1* | 3/2013 | Lu | G06F 1/206 713/322 |
| 2014/0089642 A1* | 3/2014 | Gottschlich | G06F 11/3664 712/220 |
| 2014/0129880 A1* | 5/2014 | Gopalakrishnan | G06F 11/0715 714/38.11 |
| 2015/0121052 A1* | 4/2015 | Emma | G06F 9/4403 713/1 |
| 2015/0169239 A1* | 6/2015 | Sakai | G06F 3/0647 711/162 |
| 2015/0378870 A1* | 12/2015 | Marron | G06F 11/362 717/128 |
| 2016/0132381 A1* | 5/2016 | Bello | G06F 11/0778 714/45 |
| 2016/0154664 A1* | 6/2016 | Iwamatsu | G06F 9/45558 718/1 |
| 2016/0184712 A1* | 6/2016 | Colenbrander | A63F 13/79 463/29 |
| 2016/0246691 A1* | 8/2016 | Clarke | G06F 11/1474 |

* cited by examiner

FULL STATE SESSION REVIVING, FORKING, AND SNAPSHOTING BASED ON AN APPLICATION DATA DUMP

TECHNICAL FIELD

The present disclosure generally relates to reproducing application sessions on computing devices, and more specifically to reviving, forking, and snapshotting an application session based on an application data dump.

BACKGROUND

Managing application sessions and session state is an important aspect of software operability. For example, if an application unexpectedly shuts down while a user is using it (e.g., due to a crash), the user may desire to restore her session to its identical pre-crash state. In some cases, a user of an application may desire to revert or have access to a previous state of her session (e.g., several hours or days ago). Also, in some cases, a user may want to transfer an identical application session from one device to another, or to replicate or "fork" an application session to have two identical sessions.

Existing technologies typically attempt to resolve the above challenges using file "save" and "open" mechanisms. Some applications automatically save a file while it is worked on by a user. For example, an application may save a file every few minutes while a user is working on it and, if the application undergoes an unexpected termination, the application can make the most recent saved version of the file available to the user the next time the user opens the application on the device. Some existing technologies have an automatic process of storing previously saved versions of a file so that, if the user wants to revert to a previous version of the file, she can browse through a history of previously saved versions and open a previous version of the file. Also, if a user wants to transfer a session to another device, she can transfer her file to the other device and open it there.

However, such technologies have significant drawbacks. In many cases, opening a saved file does not restore several aspects of the application session in which the file was saved. This fails to reproduce the exact session in that when a session is restored, reverted, or duplicated from a saved file, not all aspects of the session are recreated. Namely, with conventional file save technologies, the aspects of the user's session that are recreated are limited to what is saved and opened in the file. Numerous other aspects of the session may be lost. Such lost aspects may include data that is stored by cut, copy, and paste functions (e.g., data copied to a clipboard in a word processing application), a history of changes (e.g., changes that can be reversed using the "undo" command), and various other attributes of the session that are not captured by a file "save" function. In light of all of these shortcomings, a more efficient system is desirable for capturing and reproducing the full state of application sessions.

DETAILED DESCRIPTION

Systems and methods in accordance with various embodiments of the present disclosure overcome at least some of the above mentioned shortcomings and deficiencies by providing an improved mechanism for capturing and reproducing the full state of application sessions. The improved mechanism can be applied in various implementations, such as full state reviving, reverting, forking, and snapshotting of application sessions.

While conventional systems generally take an approach where a previously saved version of a file is used to reproduce an application session, which generally results in losing various aspects of a session, the embodiments described herein enable an approach where a full state of an application session can be reproduced by recording various areas of application session data, including information contained in a full application memory dump and other application data.

In various embodiments, the process begins by receiving an instruction to capture an application session. The instruction may be generated manually or automatically, such as by a process that periodically captures application session states in order to enable the user to restore her session (e.g., in case it is unintentionally terminated) or to allow her to revert to a session from a previous point in time, i.e., "snapshotting". In an embodiment, the session may also be captured in order to transfer the session to another device or to duplicate or "fork" the session. Once the instruction is received, the system captures the session by performing an application session data dump, in which areas of the application's memory as well as other session data, such as operating system data regarding the running instance of the application, are dumped. This memory dump can be produced by the operating system (OS) in response to a request from an agent operating on the device. For example, Microsoft Windows contains the ability to identify a specific process (application) and request a memory dump of that process to be generated by the OS. Other operating systems typically contain similar functionality and traditionally this functionality was most commonly used for debugging purposes. In various embodiments described herein, the information in the memory dump can be used in combination with other information recorded by the agent operating in order to capture and restore or replicate the application session. In one embodiment, the agent operating on the device identifies the application, requests a memory dump of the application from the OS and records the memory dump or various portions of the memory dump into the session capture file. In addition, the agent obtains one or more Central Processing Unit (CPU) register values on the device and records the CPU register values in the session capture file. Other information can also be recorded in the session capture file. Consequently, the session capture is produced by capturing the dumped application session data, as well as information from a number of other locations as described throughout this disclosure.

In various embodiments, the dumped application session data is captured using a variety of techniques. For example, some areas of the dumped data (such as the memory image) can be copied and stored in the session capture directly. Other parts of the application data can be read and pertinent portions of the information can be stored in the session capture.

As used herein, the terms "session capture" and "application session capture" refer to a file containing data that defines an application session. As described herein, certain data regarding an application session can be recorded to produce a session capture. The recorded data in the session capture can then be used to reproduce the application session.

As used herein, the terms "application session data" and "application session state" are used interchangeably and refer to various types of data that can be captured and used to reproduce the full state of an application session. Such data can define or determine the application session. Examples of application session data include application memory, any information in the operating system regarding the session, open handles, loaded libraries, issued locks and so on. As used herein, "application memory" refers to the memory image of the application, which are the pages of the application that are open, and content of the CPU registers of the application.

After the session data is captured, it is stored in the session capture file so that it can be used to reproduce the application session, when requested. In some embodiments, the session capture is stored on the device. In other embodiments, the session capture can be transferred to and stored at a remote location, such as on a server. For example, in implementations where the session is reproduced on or transferred to another device, it may be favorable to store the session capture at a remote location, from where the session capture can be transferred to the receiving device.

After the session is captured, the session capture can be used to reproduce the application session on the same or different computing device for restoring, reverting, forking, transferring, etc., the application session. To reproduce the application session, the application is launched and the session capture is used to rebuild the application session data and, hence, restore the application session. Different methods can be used to restore different parts of the application session data. For example, some data from the application session capture (such as the memory image) can be loaded from the session capture into the live memory on the computing device. Further, based on the session capture, CPU register values and handle references can be set and libraries can be loaded. In some cases, when the locations of certain resources or references (such as handle references, memory locations, library locations, etc.) on the device are different than they were when the session was captured (for example, in cases where the session is being reproduced on a different device), a driver module operating in the background on the computing device can be used to re-map locations and references to new locations and references. As a result, a full state of the application session is reproduced.

Figure 1:
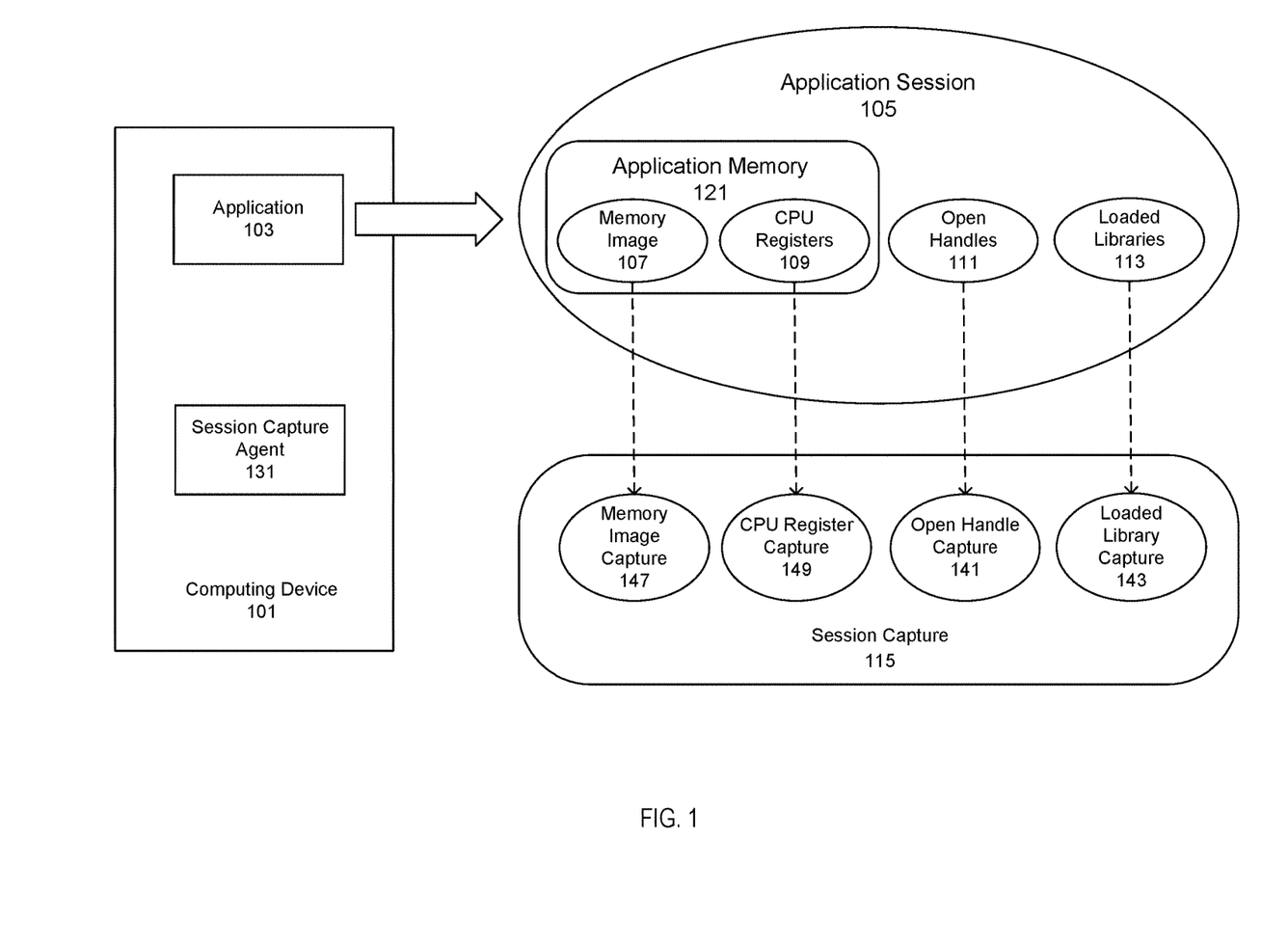
FIG. 1 illustrates an example diagram of an application session capture produced on a computing device, in accordance with various embodiments.

FIG. 1 illustrates an example diagram of an application session capture produced on a computing device, in accordance with various embodiments. As illustrated in the example of FIG. 1, an application 103 executes on a computing device 101. The execution of the application 103 produces a corresponding application session 105. Various components on the computing device 101 contain data (the application session data) that determines the application session 105. Such components include application memory 121, which contains a memory image 107 and central processing unit (CPU) registers 109. Components that determine the application session 105 also include open handles 111 to kernel objects, and loaded libraries 113 in the session 105. Each component (e.g., 107, 109, 111, 113) can be physically located in one or more various corresponding places on the computing device 101, such as in the CPU registers; in memory, such as random-access memory (RAM); in persistent storage, such as a hard disk or a solid state drive (SDD); and so on.

The computing device 101 further comprises a session capture agent 131, which performs various functions related to capturing sessions (e.g., 105) on the computing device 101. In various embodiments, when instructed to capture the session 105, the agent 131 captures application session data of the application session 105 to produce the session capture 115. For example, the agent 131 can capture components (e.g., 107, 109, 111, 113) of the application session 105 and store the captured component information in a session capture 115. The session capture 115 contains a memory image capture 147, which is a capture of the memory image 107, as well as a CPU register capture 149, an open handle capture 141, and a loaded library capture 143, which are captures of the CPU registers 109, open handles 111, and loaded libraries 113 of the session 105, respectively. Thus, the session capture 115 is a file produced by the agent 131 that contains necessary information such that the various components of the session data 107, 109, 111, 113 and, hence, the application session 105, can be reproduced based on the session capture 115.

The session capture 115 can contain any applicable data that makes up a component (e.g., 107, 109, 111, 113), or portions thereof. In various embodiments, the session capture 115 can contain other information corresponding to a component (e.g., 107, 109, 111, 113) in lieu of, or in addition to, any actual data that makes up the component (e.g., 107, 109, 111, 113), as may be necessary or desirable in order to enable the system to efficiently reproduce the session 105 based on the capture 115. Hence, different mechanisms can be used for capturing different components (e.g., 107, 109, 111, 113) of the application session 105.

In various embodiments, the memory image 107 is an image of the pages of the application that are open. For example, the memory image 107 can contain the necessary data to replicate the pages of the application 103 that are open in the application session 105. In various embodiments, the CPU registers 109 are the register values corresponding to the application 103 located in the registers of processors on the computing device 101. The information held in the CPU registers 109 can provide information such as an instruction pointer (which indicates the next line of code that needs to be executed), information relevant for function calls, and other data. Capturing the information held in the CPU registers 109 may be important for preserving various aspects of the session 105, such as ensuring that when the session 105 is reproduced, it resumes in the same exact place in execution as when it was captured.

In order to capture the memory image 107 and the CPU registers 109, the agent 131 can requests a memory dump of the application memory 121 from the operating system (OS) of the device 101. The OS of the computing device 101 may have a built in function, which is generally available on many operating systems, that enables such requests to the OS as a standard feature of the OS. In various embodiments, the agent 131 can make such a request to the OS of the computing device 101 to generate a dump of the application memory 121. The memory image 107 is produced as part of the memory 121 dump and can be captured by the agent 131 in the session capture 115 as the memory image capture 147. For example, to capture the memory image 107 in the session capture 115, the agent 131 can copy the data from the dumped memory image 107 and store the data in the session capture 115 as part of the memory image capture 147.

Similarly, the CPU register values 109 can be dumped as part of the memory 121 dump and can be captured by the agent 131 in the session capture 115 as the CPU register capture 149. For example, to capture the CPU registers 109, the agent 131 can copy the data from the CPU registers 109 and store the data in the session capture 115 as part of the CPU register capture 149. In an embodiment, the agent 131 can read the data from the CPU register dump and record the values of the registers in the CPU register capture 149.

In various embodiments, the open handles 111 to kernel objects include open handles to objects such as files, locks, monitors, pipes, etc. in the session 105. For example, the open handles 111 can include open file handles. In various embodiments, an open file handle is a temporary reference (such as a number or other file descriptor) assigned by the operating system to a file when the file is opened by the application. The operating system uses the file handle internally when accessing the file. The session 105 can include an open file handle for every file that is open in the application 103 during the session 105. The open file handles 111 can be captured in the session capture 115 and used to re-open the files when the session 105 is reproduced from the capture 115.

In various embodiments, open handles 111 also include lock information. Various operating systems use locks to control accesses by applications to mutual resources. For example, when an application accesses a resource, in some cases a lock needs to be placed on the resource to prevent other applications from accessing the resource (e.g., to prevent conflicts). Locks are issued by the operating system and various locking mechanisms are available in most operating systems. In various embodiments, such lock information can be captured in the session capture 115, such that locks previously issued in the application session 105 can be reissued by the OS when the session 105 is restored from the session capture 115. By restoring the locks, the application 105 is able to re-obtain locks on resources and release them at a later time, which may prevent any possible system deadlocks. Thus, in various embodiments, every previously acquired or currently live lock is saved as part of the open handle capture 141 in the session capture 115, and allows the system to re-issue each lock so the application 105 can continue working from exactly the same place where the session 105 was captured.

In various embodiments, information regarding open handles 111, such as open handles to objects including files, locks, monitors, pipes, etc. can be obtained by the agent 131 from the operating system of the device 101. For example, various operating systems have built in functions (which are often used in debugging) that can be used to request an application's open handles to kernel objects. In various embodiments, the agent 131 can use such functions of the operating system to obtain or dump the open handle 111 information. Once the information is obtained, it can be stored in the open handle capture 141 or the agent 131 can read the data and record any pertinent portions of the data in the capture 141.

In various embodiments, loaded libraries 113 includes libraries that have been loaded and are used by the application 103 in the session 105. When a library is loaded to be used by an application (or by several applications), the library remains loaded for the application to have access to it. When reproducing a session 105, the loaded libraries 113 can be re-loaded to ensure that the same loaded libraries are available to the application 103 in the reproduced session.

In order to reproduce the loaded libraries 113, the libraries are captured as a loaded library capture 143 in the session capture 115. The loaded library capture 143 can then be used to re-load the loaded libraries 113 when the session is reproduced, as described in more detail below. In various embodiments, producing the loaded library capture 143 begins by dumping or obtaining information regarding the loaded libraries 113. For example, the agent 131 can request such information from the operating system. Various operating systems have built in functionalities that allow such access to the loaded library information of an application.

The library information retrieved from the OS may include, for each loaded library in the application session 105, information such as the name of the library, its path in the file system, the memory address to which the library was loaded, its version, and the company name that created the library. Consequently, information that is needed to identify and re-load the library may be obtained from the dump and stored as part of the loaded library capture 143 to be later used to re-load the loaded libraries 113 when restoring the session 105. In various embodiments, the actual content of loaded libraries 113 may not be present in the loaded library capture 143.

Figure 2:
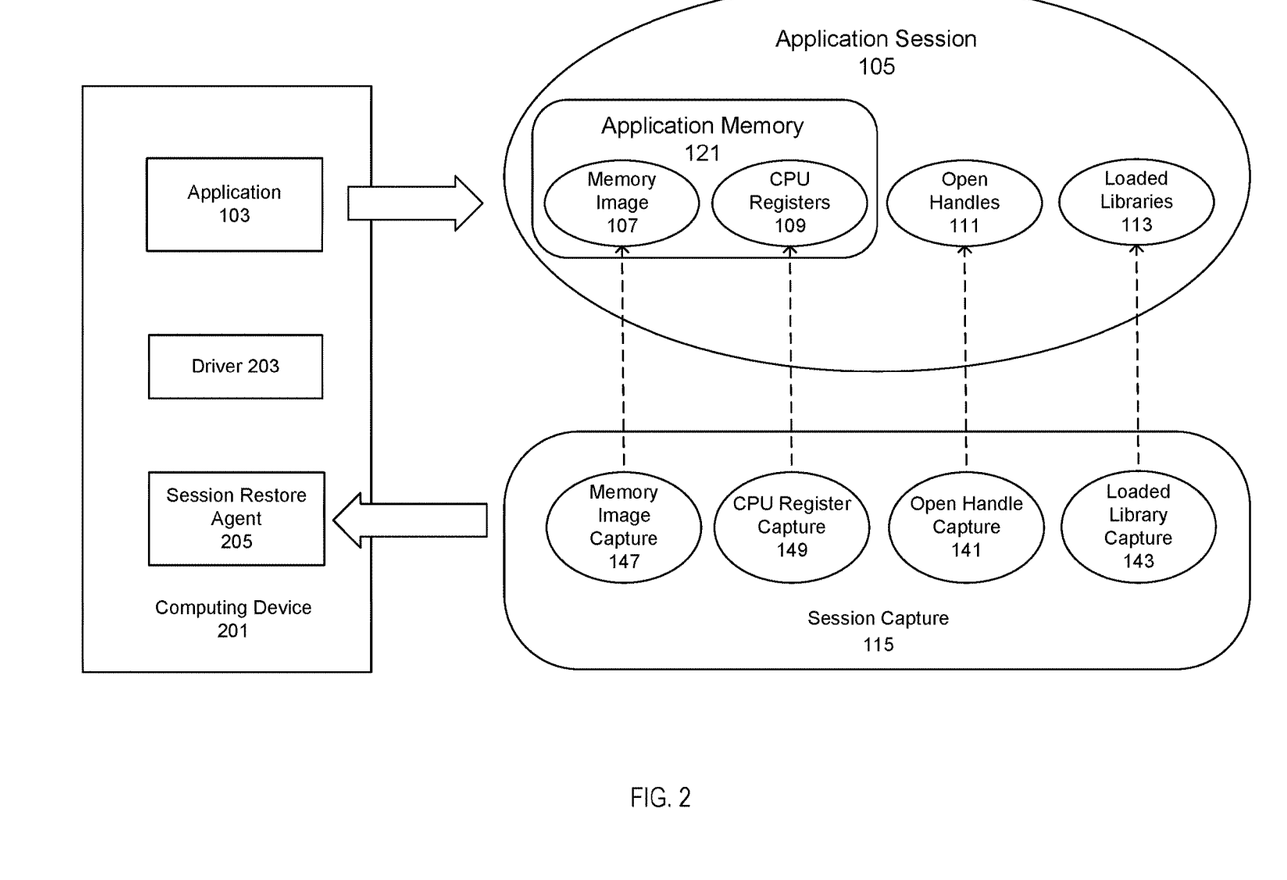
FIG. 2 illustrates an example diagram of an application session being restored from a session capture on a computing device, in accordance with various embodiments.

FIG. 2 illustrates an example diagram of an application session being restored from a session capture on a computing device, in accordance with various embodiments. As illustrated in the example of FIG. 2, an application 103, which is the same application 103 as in the example of FIG. 1, executes on the computing device 201. A session capture 115, which is the session capture 115 that was produced in the example of FIG. 1, is used by a session restore agent 205 executing on the device 201 to reproduce the application session 105 for the executing application 103.

In some embodiments, the computing device 201 can be the same computing device as computing device 101 of FIG. 1. In other embodiments, the computing device 201 can be a different computing device than the computing device 101 of FIG. 1. For example, in implementations where the session capture 115 is used to reproduce the application session 105 on the same device where the capture 115 was produced, device 101 and 201 are the same. Conversely, in implementations where the session capture 115 is used to reproduce the application session 105 on a different device than where the capture 115 was produced, device 101 and 201 are different.

Hence, in implementations where the session capture 115 is used to reproduce the session 105 on the same device as where the capture was produced, the session capture 115 may be stored on the computing device after it is produced until it is used. In implementations where the session capture 115 is used to reproduce the session 105 on a different device than where the capture was produced, the session capture 115 may be conveyed from one device to the other (e.g., over a network from a server or from another device).

As illustrated, the session capture 115 contains several captured components, including a memory image capture 147, a CPU register capture 149, an open handle capture 141, and a loaded library capture 143. To reproduce the application session 105, the agent 205 uses each of the captured components to reproduce a corresponding component of the session 105. Hence, the agent 205 uses the memory image capture 147 to restore the memory image 107 in the session 105, the CPU register capture 149 to restore the CPU registers 109 in the session 105, the open handle capture 141 to restore the open handles 111 in the session, and the loaded library capture 143 to restore the loaded libraries 113 in the session 105. The process of restoring each of the session components (107, 109, 111, 113) is discussed in more detail below.

Further, when the session 105 is reproduced from the capture 115, various resource locations and references on the computing device 201, such as memory locations, handle references, library addresses, etc. on the device 201 may be different from when the session capture 115 was produced. For example, the memory locations to where the memory image 107 is loaded in the reproduced session may be different from the memory locations where the memory image 107 was stored when it was captured (e.g., if the original locations are occupied by other data during session restore and the memory image 107 has to be loaded elsewhere). Also, the addresses of loaded libraries may be different than they were when the session was captured; open handle references may be different; and so on. Accordingly, if the session 105 is restored from the capture 115 without updating the locations and references stored in the session capture 115 to items or resources that may now have different locations or references, the session 105 may not function properly. To address this issue, the computing device implements a driver 203, which executes on the computing device 201, that maps locations or references used in the new session 105 that correspond to objects that have different locations or references than when the session was captured to the corresponding new locations or references.

For example, in various embodiments, in order to restore the memory image 107 of the application session 105 from the memory image capture 147, the agent 205 loads the information containing the memory image 107 from the capture 147 into live memory on the computing device 201. However, in many cases, the memory image 107 may be loaded into a different location than where it was when captured. This may occur when the memory locations (or addresses) from where the memory image 107 was captured are occupied (e.g., by another application). For example, during the loading of the memory image 107 into a memory location of the live memory, the system (e.g., the agent 205) may detect that the memory location in the live memory is being used by a process associated with a different application. In these cases, the memory image 107 can be loaded into a new location (e.g., a new range of addresses) and the driver 203 can map or redirect all requests by the application that were trying to access the previous memory locations into the new memory areas.

In various embodiments, in order to restore the CPU registers 109 of the application session 105 from the CPU register capture 147, the agent 205 reads the CPU register values from the capture 147 and transfers those values to the corresponding CPU registers in the processor(s) of the computing device 201.

In various embodiments, in order to restore the open handles 111 of the application session 105 from the open handle capture 141, the agent 205 reads the open handles from the capture 141 and restores any applicable open handles in the restored session. However, in some cases, open handle references in the new session may be different than in the previous session. In these situations, the driver 203 can remap the old handle references to the new handle references For example, the driver 203 can remap open file handles. Namely, if the application 103 had an open handle to a file, then, to reopen that file, the agent 205 needs to restore a handle to that file. However, the previous handle reference (which can be a number) assigned to this file can now be different than it was when the session was captured. In this case, the driver 203 can remap all requests to the old handle number to the new handle number assigned when the session was restored.

Similarly, open handles to any kernel objects can be remapped as necessary for the session to function properly.

In various embodiments, in order to restore the loaded libraries 113 of the application session 105 from the loaded library capture 143, the agent 205 reads the loaded library capture 143 to identify which libraries need to be loaded and loads the corresponding libraries. For example, the agent 205 can access a list of unloaded libraries maintained by the OS and identify corresponding libraries to load based on the capture 143. However, because a library may be loaded to a different address in the new session than where it was in the previous session, the calls from the application to the library may need to be redirected from the old location to the correct location, which can be performed by the driver 203. Hence, the driver can remap the old library addresses to the new library addresses in the restored session 105.

Hence, when the agent 205 reloads a library into memory, the agent can retain the address of the newly loaded library and redirect accesses by the application 103 made to the old address, to the new address. For example, in the previous session, the application 103 may have loaded a library to a previous address (e.g., 0x12345678). In the restored session, the library may be reloaded to a new address (e.g., 0x87654321). Because, in the new session, the application 103 may still attempt to access the library at the previous address (0x12345678), the driver 205 can intercept the calls to the library and redirect them to the new address (0x87654321) in order for the application 103 to be able to reach the library.

Figure 3:
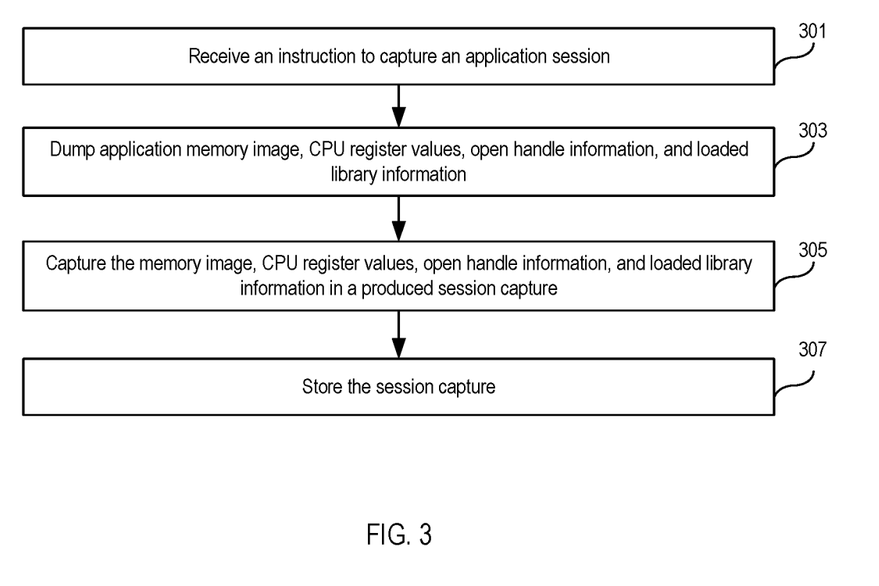
FIG. 3 illustrates an example process flow for capturing an application session, in accordance with various embodiments.

FIG. 3 illustrates an example process flow for capturing an application session, in accordance with various embodiments. In operation 301, an instruction is received to capture the application session. For example, the instruction can be received by an application capture agent operating on a computing device where the application is executing. In various embodiments, the instruction can be generated and sent to the agent at predetermined intervals (to auto-save sessions), or when a user desires to save a session (to save it, reproduce it, transfer it, fork it, etc.). In operation 303, the application memory image, CPU register values, open handle information, and loaded library information are dumped. For example, the agent can request this information from the operating system of the computing device. After the information is dumped, in operation 305, the memory image, CPU register values, open handle information, and loaded library information are captured in a produced session capture. For example, the agent can capture the information by storing the memory image data, the CPU register values, the open handle references, and the loaded library information in the session capture. Consequently, in operation 307, the session capture is stored until it is used for reproducing the session.

Figure 4:
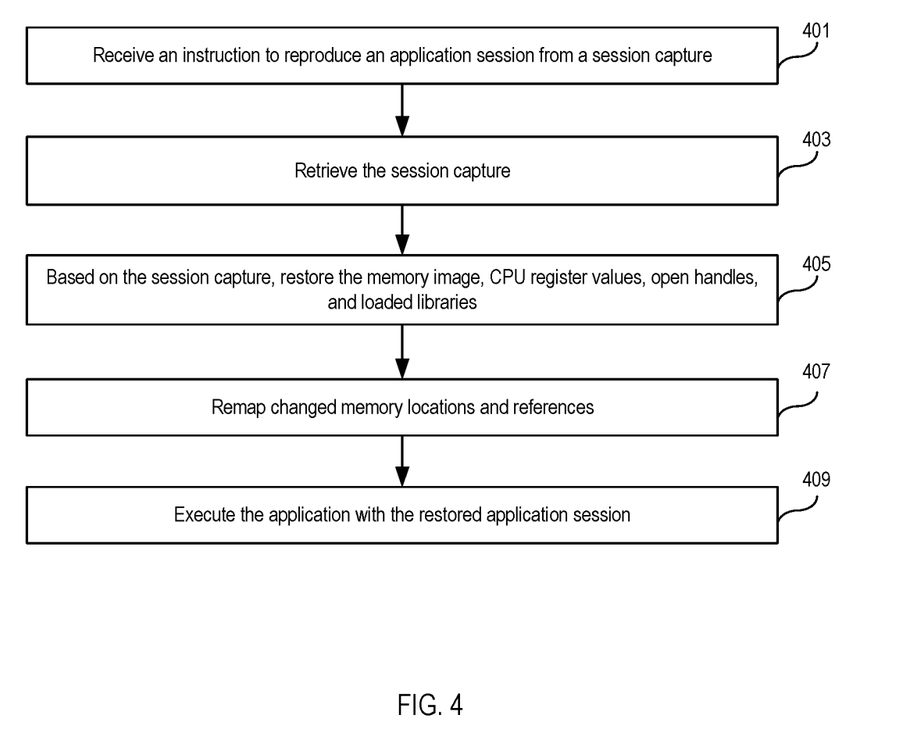
FIG. 4 illustrates an example process flow for reproducing an application session based on a session capture, in accordance with various embodiments.

FIG. 4 illustrates an example process flow for reproducing an application session based on a session capture, in accordance with various embodiments. In operation 401, an instruction is received to reproduce an application session from a session capture. For example, the instruction may be received by a session restore agent operating on a client device where the application is executing. In various embodiments, the instruction can be generated in response to a user electing to restore a session from a previous capture, e.g., when restoring a session, reverting a session, transferring a session to another device, forking a session, etc. In operation 403, the session capture is retrieved. For example, the agent can retrieve the session capture from a database where session captures are stored. In some embodiments, such as where the session is reproduced on a different device than where it was captured, the session capture can be conveyed to the device, for example, from a server connected over a network.

In operation 405, the memory image, CPU register values, open handles, and loaded libraries of the application session are restored based on the session capture. For example, the agent can load the memory image into the live memory of the device, set the CPU register values and open handles, and load the libraries based on the information in the session capture. In operation 407, changed memory locations and references are remapped. For example, in cases where the memory image was loaded to different locations, the agent can remap previous addresses to the new addresses. Similarly, in cases of changed open handle references, the agent can remap previous open handle references to the new open handle references. Also, in cases where libraries were loaded to different addresses, the agent can remap the old library addresses to the new library addresses. Lastly, in operation 409, the application is executed with the restored application session.

As described above, the technologies provided herein enable systems where an application session can be captured and reproduced in ways that preserve the full state of the session. The technology can be implemented in a wide range of contexts. For example, in an embodiment, a computing device can be configured to capture an application session at predetermined intervals (e.g., every 5 minutes). Then, if the session is terminated unintentionally (e.g., due to a crash), the user can recover by restoring the application to the most recently save session. In an embodiment, a session can be captured and restored manually. In an embodiment, a session can be captured any time a user chooses to save the file and restored when the user opens the file. This way, the user is able to recover the full-state of the session when she opens the file.

In another embodiment, a session can be captured on one device, the capture can be transferred to another device (e.g., over a server), and the capture can be used to reproduce the session on the other device. For example, this can be useful in a situation where a user is working on one machine (e.g., an office machine) and desires to transfer the application session to another machine (e.g., a home machine). This way, the user is able to transfer the full-state of the application session to the other machine.

In yet another embodiment, the technology can be implemented in live session forking to produce duplicate application sessions running on a machine, such that the same application will run in two processes in the exact same state, i.e., in two, identical but separate application instances. This can be performed by capturing a session on a machine and reproducing the session on the same machine in parallel with the first session. The process can involve, for example, dumping the application memory of a running application, loading it into a different memory area, and using a driver for re-mapping handles and memory requests to new locations.

Figure 5:
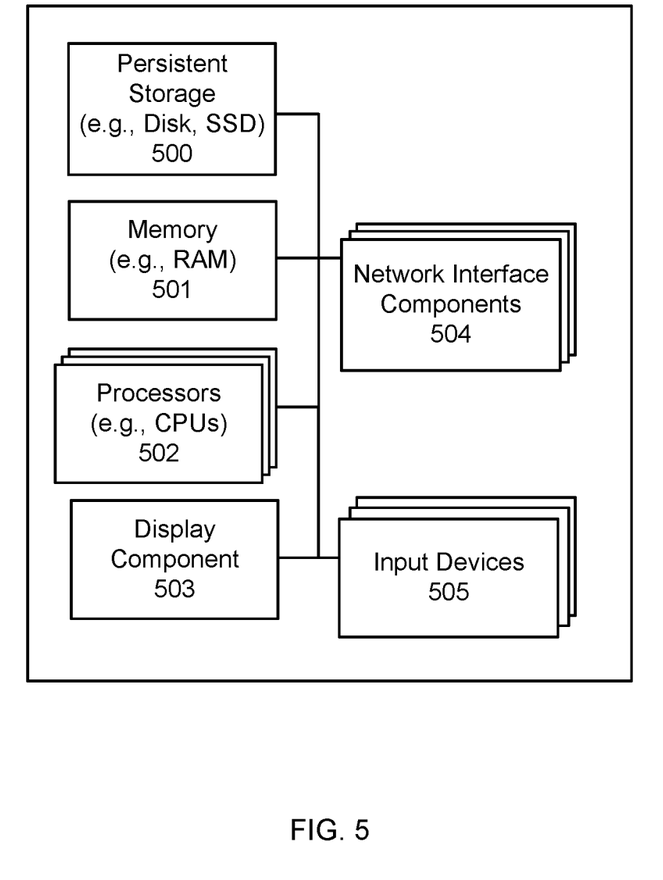
FIG. 5 illustrates an example of some general components of a computing device, in accordance with various embodiments.

FIG. 5 illustrates an example of some general components of a computing device, in accordance with various embodiments. In this particular example, the device includes one or more processors (e.g., central processing units (CPUs) 502 for executing instructions that can be stored in a storage medium component. The storage medium can include many types of memory, persistent data storage, or non-transitory computer-readable storage media. For example, the storage medium may take the form of random access memory (RAM) 501 storing program instructions for execution by the processor(s) 502, a persistent storage (e.g., disk or SSD) 500, a removable memory for sharing information with other devices and/or the like. The computing device typically can further comprise a display component 503, such as a monitor, a touch screen, liquid crystal display (LCD), or the like. In various embodiments, the computing device will include at least one input device 505 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 504 for communicating over various networks, such as a Wi-Fi, Bluetooth, RF, wired, or wireless communication systems. The device in many embodiments can communicate over a network, such as the Internet, and may be able to communicate with other devices connected to the same or other network.

While various embodiments described herein illustrate the invention as being implemented via a server (e.g., 100) connected over a network (e.g., 112) to various endpoints (e.g., 110-1, 110-2, 110-N), the invention can be practiced in any other applicable architectures where the described techniques can be used to deploy an application on a computing device using a minimal set and a maximal set.

Various embodiments described herein can be implemented in a wide variety of environments, which in some cases can include one or more user computers, computing devices, or processing devices which can be used to operate any of a number of applications. User devices, endpoints, or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method, comprising:
    receiving an instruction to capture a session of an application executing on a computing device by an agent for capturing application sessions, the agent executing on the computing device;
    in response to the instruction to capture the session of the application, producing an application session capture file by the agent, the application session capture file containing application memory corresponding to the session but not containing the application itself, wherein producing the session capture file comprises:
        sending by the agent to an operating system of the computing device a request to dump the application memory, the application memory comprising information sufficient to capture a full state of the application session including a memory image containing one or more memory pages associated with the application and one or more CPU register values associated with the application;
        in response to the request from the agent, dumping by the operating system the application memory comprising information sufficient to capture the full state of the application session including the memory image containing one or more memory pages associated with the application and the one or more CPU register values associated with the application;
        recording the dumped memory image in the session capture file; and
        recording the dumped CPU register values in the session capture file;
    receiving a request to restore the application session on the computing device;
    launching the application on the computing device and reproducing the full state of the captured session in the executing application based on the session capture file, such that the application resumes executing in the same exact place in execution as when the session was captured by:
        loading the memory image of the application from the session capture file into live memory; and
        setting values in one or more CPU registers based on the CPU register values recorded in the session capture file.

2. The method of claim 1, wherein reproducing the application session further comprises:
    during a loading of the memory image into a memory location of the live memory, detecting that the memory location in the live memory is being used by a process associated with a different application; and
    loading the memory image into a new memory location.

3. The method of claim 2, further comprising:
    remapping the memory location to the new memory location by a driver operating on the computing device.

4. The method of claim 1, wherein:
    producing the session capture file further comprises recording information regarding open handles to kernel objects; and
    reproducing the application session further comprises remapping open handles in the reproduced session to new open handles in response to detecting that the session is reproduced on a second computing device.

5. The method of claim 1, wherein:
    producing the session capture further comprises dumping information regarding loaded libraries and capturing the information regarding the loaded libraries; and
    reproducing the application session further comprises remapping loaded library addresses in the reproduced session to new loaded library addresses.

6. The method of claim 4, wherein the open handles to kernel objects include open handles to files, open handles to locks, open handles to monitors, and open handles to pipes.

7. The method of claim 2, wherein the application session is captured on one computing device and reproduced on another computing device.

8. A computing system, comprising:
at least one processor; and
memory including instructions that, when executed by the at least one processor, cause the computing device to perform the steps of:
receiving an instruction to capture a session of an application executing on a computing device by an agent for capturing application sessions, the agent executing on the computing device;
in response to the instruction to capture the session of the application, producing an application session capture file by the agent, the application session capture file containing application memory corresponding to the session but not containing the application itself, wherein producing the session capture file comprises:
sending by the agent to an operating system of the computing device a request to dump the application memory, the application memory comprising information sufficient to capture a full state of the application session including a memory image containing one or more memory pages associated with the application and one or more CPU register values associated with the application;
in response to the request from the agent, dumping by the operating system the application memory comprising information sufficient to capture the full state of the application session including the memory image containing one or more memory pages associated with the application and the one or more CPU register values associated with the application;
recording the dumped memory image in the session capture file; and
recording the dumped CPU register values in the session capture file;
receiving a request to restore the application session on the computing device;
launching the application on the computing device and reproducing the full state of the captured session in the executing application based on the session capture file, such that the application resumes executing in the same exact place in execution as when the session was captured by:
loading the memory image of the application from the session capture file into live memory; and
setting values in one or more CPU registers based on the CPU register values recorded in the session capture file.

9. The computing system of claim 8, wherein reproducing the application session further comprises:
during a loading of the memory image into a memory location of the live memory, detecting that the memory location in the live memory is being used by a process associated with a different application; and
loading the memory image into a new memory location.

10. The computing system of claim 9, wherein the memory further includes instructions that when executed by the at least one processor, cause the computing device to perform the steps of:
remapping the memory location to the new memory location by a driver operating on the computing device.

11. The computing system of claim 8, wherein:
producing the session capture file further comprises recording information regarding open handles to kernel objects; and
reproducing the application session further comprises remapping open handles in the reproduced session to new open handles in response to detecting that the session is reproduced on a second computing device.

12. The computing system of claim 8, wherein:
producing the session capture further comprises dumping information regarding loaded libraries and capturing the information regarding the loaded libraries; and
reproducing the application session further comprises remapping loaded library addresses in the reproduced session to new loaded library addresses.

13. The computing system of claim 11, wherein the open handles to kernel objects include open handles to files, open handles to locks, open handles to monitors, and open handles to pipes.

14. The computing system of claim 9, wherein the application session is captured on one computing device and reproduced on another computing device.

15. A non-transitory computer readable storage medium comprising one or more sequences of instructions, the instructions when executed by one or more processors causing the one or more processors to execute the operations of:
receiving an instruction to capture a session of an application executing on a computing device by an agent for capturing application sessions, the agent executing on the computing device;
in response to the instruction to capture the session of the application, producing an application session capture file, the application session capture file containing application memory corresponding to the session but not containing the application itself, wherein producing the session capture file comprises:
sending by the agent to an operating system of the computing device a request to dump the application memory, the application memory comprising information sufficient to capture a full state of the application session including a memory image containing one or more memory pages associated with the application and one or more CPU register values associated with the application;
in response to the request from the agent, dumping by the operating system the application memory comprising information sufficient to capture the full state of the application session including the memory image containing one or more memory pages associated with the application and the one or more CPU register values associated with the application;
recording the dumped memory image in the session capture file; and
recording the dumped CPU register values in the session capture file;
receiving a request to restore the application session on the computing device;
launching the application on the computing device and reproducing the full state of the captured session in the executing application based on the session capture file, such that the application resumes executing in the same exact place in execution as when the session was captured by:
loading the memory image of the application from the session capture file into live memory; and
setting values in one or more CPU registers based on the CPU register values recorded in the session capture file.

16. The non-transitory computer readable storage medium of claim 15, wherein reproducing the application session further comprises:
during a loading of the memory image into a memory location of the live memory, detecting that the memory location in the live memory is being used by a process associated with a different application; and
loading the memory image into a new memory location.

17. The non-transitory computer readable storage medium of claim 16, further comprising instructions that when executed by the one or more processors cause the one or more processors to execute the operations of:
remapping the memory location to the new memory location by a driver operating on the computing device.

18. The non-transitory computer readable storage medium of claim 15, wherein:
producing the session capture file further comprises recording information regarding open handles to kernel objects; and
reproducing the application session further comprises remapping open handles in the reproduced session to new open handles in response to detecting that the session is reproduced on a second computing device.

19. The non-transitory computer readable storage medium of claim 15, wherein:
producing the session capture further comprises dumping information regarding loaded libraries and capturing the information regarding the loaded libraries; and
reproducing the application session further comprises remapping loaded library addresses in the reproduced session to new loaded library addresses.

20. The non-transitory computer readable storage medium of claim 18, wherein the open handles to kernel objects include open handles to files, open handles to locks, open handles to monitors, and open handles to pipes.

* * * * *